United States Patent
Lyle et al.

(10) Patent No.: US 8,438,574 B1
(45) Date of Patent: May 7, 2013

(54) GENERATING MONOTONE HASH PREFERENCES

(75) Inventors: Michael P. Lyle, Morgan Hill, CA (US); Robert F. Ross, San Jose, CA (US)

(73) Assignee: Translattice, Inc., Santa Clara, CA (US)

( * ) Notice: Subject to any disclaimer, the term of this patent is extended or adjusted under 35 U.S.C. 154(b) by 366 days.

(21) Appl. No.: 12/806,236

(22) Filed: Aug. 5, 2010

Related U.S. Application Data

(60) Provisional application No. 61/274,295, filed on Aug. 14, 2009.

(51) Int. Cl.
*G06F 9/46* (2006.01)

(52) U.S. Cl.
USPC ............ 718/104; 718/100; 718/102; 718/103

(58) Field of Classification Search .................. None
See application file for complete search history.

(56) References Cited

U.S. PATENT DOCUMENTS

| | | | | |
|---|---|---|---|---|
| 7,555,544 B1 * | 6/2009 | Rattner et al. | ................ | 709/223 |
| 7,689,682 B1 * | 3/2010 | Eldering et al. | .............. | 709/223 |
| 7,941,805 B2 * | 5/2011 | Dillenberger et al. | ........ | 718/105 |
| 2006/0036747 A1 * | 2/2006 | Galvin et al. | ................. | 709/228 |
| 2006/0265420 A1 * | 11/2006 | Macnaughton et al. | ... | 707/104.1 |

OTHER PUBLICATIONS

Aspnes et al. Ranged hash functions and the price of churn. Proceedings of the 19th Annual ACM-SIAM Symposium on Discrete Algorithms, pp. 1066-1075, 2008.

Karger et al. Consistent hashing and random trees. Proceedings of the 29th Annual ACM Symposium on the Theory of Computing, pp. 654-663, 1997.

Thaler et al. Multipath Issues in Unicast and Multicast Next-Hop Selection, NextHop Technologies, Nov. 2000.

* cited by examiner

*Primary Examiner* — Emerson Puente
*Assistant Examiner* — Jonathan R Labud
(74) *Attorney, Agent, or Firm* — Van Pelt, Yi & James LLP

(57) ABSTRACT

Selecting a resource to fulfill a resource requirement is disclosed. For each resource requirement, a resource-specific affinity value is computed with respect to each of a plurality of resources. A bias is applied to each of at least a subset of the resource-specific affinity values. The biased, as applicable, resource-specific affinity values are sorted into a resource preference list. The sorted preference list is used to select a resource to fulfill the resource requirement.

31 Claims, 8 Drawing Sheets

GENERATING MONOTONE HASH PREFERENCES

CROSS REFERENCE TO OTHER APPLICATIONS

This application claims priority to U.S. Provisional Patent Application No. 61/274,295 entitled GENERATING MONOTONE HASH PREFERENCES, filed Aug. 14, 2009, which is incorporated herein by reference for all purposes.

BACKGROUND OF THE INVENTION

Hash algorithms speed up searching and sorting by mapping an object key to a bucket where the associated object value or object value locator is stored. They also find use in load balancing applications where a key associated with a request (such as a username, or client ID, or network address) is used to determine what resources should be used to satisfy the request. In recent years, there has been extensive use of consistent hash functions in load balancing and peer to peer applications.

Typically, in both load balancing and peer to peer applications "churn" (changes in the number of buckets) occurs. Conventional hash algorithms cause nearly all of the keys to be remapped between buckets when the number of buckets changes. By contrast, consistent hashing algorithms provide hash table semantics where addition or removal of buckets do not cause significant numbers of objects to be remapped between buckets that have not been added or removed. The method of consistent hashing allows the hash table to map to physical objects, like disks or computers or network nodes, which may either be removed due to failure or added in response to load. When consistent hashing is used, the hashed objects (which, among other things, may be data objects, network sessions, or users) do not suffer excessive churn when the set of physical resources is changed.

BRIEF DESCRIPTION OF THE DRAWINGS

Various embodiments of the invention are disclosed in the following detailed description and the accompanying drawings.

DETAILED DESCRIPTION

Figure 1:
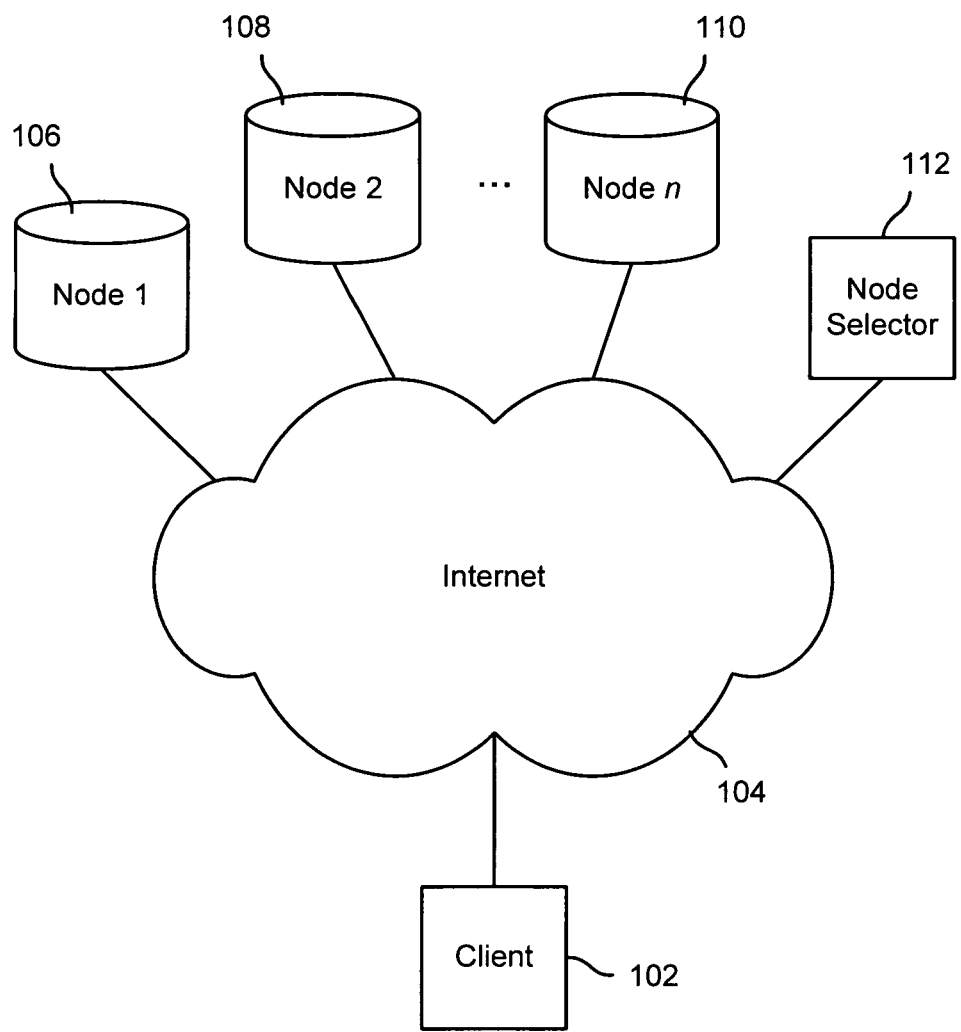
FIG. 1 is a block diagram illustrating an embodiment of a network environment in which data objects are stored in a distributed manner.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating monotone hash preferences is disclosed. In various embodiments, for each of a plurality of resources a hash or other resource-specific value is computed with respect to a resource requirement to be fulfilled. A bias is applied to one or more of the resource-specific values. The resource-specific values are sorted and a prescribed number of resources in a prescribe location within the ordered list, e.g., a first m resources in the list, are used to satisfy the resource requirement. For example, if the resource requirement includes storing a data object on m storage nodes included in a plurality of storage nodes, for each storage node in the plurality of nodes a hash is computed with respect to the data object, for example based on data comprising or associated with the data object and data associated with the node; biases are applied to one or more of the storage node-specific hash values; the biased (as applicable) node-specific hash values are sorted in an order (e.g., highest to lowest); and the data object is stored on the first m storage nodes in the sorted list.

In various embodiments described herein the terms "buckets", "nodes", and other terms are used to refer to a set of possible paths, destinations, and/or other resources one or more of which must be selected to satisfy each of a plurality of resource requirements. Broadly, techniques disclosed herein may be used to match an item included in a first set with one or more elements of a second set.

FIG. 1 is a block diagram illustrating an embodiment of a network environment in which data objects are stored in a distributed manner. In the example shown, one or more clients, represented in FIG. 1 by client 102, communicates via the Internet 104 to store data objects (potentially) distributed across a plurality of storage nodes 1 to n, represented in FIG. 1 by nodes 106, 108, and 110. A node selector 112 is configured to process requests from clients such as client 102 to store data objects, such as files or pieces thereof, and for each object to determine a prescribed number m of the available n nodes on which the object will be stored. In various embodiments, techniques disclosed herein are used to determine for each object one or more storage nodes on which the object will be stored. In various embodiments, individual machines may act as clients, storage nodes, or both.

As noted above, consistent hashing algorithms provide hash table semantics where addition or removal of buckets do not cause significant numbers of objects to be remapped between buckets that have not been added or removed. For example, in the example shown in FIG. 1, a consistent hash algorithm would ensure that removal of node 108 would not result in objects not previously stored on node 108 being moved between remaining nodes such as nodes 106 and 110. Instead, only objects previously stored on node 108 would be remapped to other, remaining nodes. Likewise, when a node is added the node should be populated without remapping objects between nodes that already existed previously.

In order to avoid unnecessary relocation of objects when there are changes in the bucket population a hash function must have the property of monotonicity. As described by Karger, et al., in *Consistent Hashing and Random Trees*, Proceedings of the 19$^{th}$ Annual ACM-SIAM Symposium on Discrete Algorithms, pages 1066-1075 (2008), "This property says that if items are initially assigned to a set of buckets $V_1$ and then some new buckets are added to form $V_2$ then an item may move from an old bucket to a new bucket, but not from one old bucket to another. This reflects one intuition about consistency: when the set of usable buckets changes, items should only move if necessary to preserve an even distribution." Because a monotone hash function generates a preference list of all possible buckets for each object we are guaranteed that the removal of a bucket will only affect the objects that preferred that bucket. Changes in any one bucket will not affect the preference ordering of the remaining buckets.

In a typical distributed environment populations of computers, hard drives, and other devices are constantly changing. New devices are introduced and old devices fail or are removed from the network. From the perspective of the hash function this means that the items to be hashed may have a constantly changing population of buckets. When the population of buckets changes it is important that no unnecessary load is generated on the network. A hash function's monotonicity is necessary and sufficient to guarantee that when a given node is introduced, removed, or has its bias changed that no two uninvolved nodes will exchange files in any direction. Any existing items which have changed their assigned bucket will only have moved to or from the added, removed, or changed bucket.

In various embodiments, the resources corresponding to hash buckets often are not homogeneous. Because the devices in a distributed environment may differ in terms of their resource availability and the cost of servicing various types of requests, it is desirable to have the hash buckets distributed unevenly. This is contrary to the historical trend of searching for balanced hash functions that uniformly distribute items between the buckets. For example, in the example shown in FIG. 1; in some embodiments the selection may be biased, e.g., based on such information as the available capacity and/or capabilities of each destination nodes and/or a relationship between the object and/or an entity with which the object is associated and one or more of the candidate nodes. For example, a node with a relative large amount of remaining storage space available may in some embodiments be more likely to be selected than one that is nearly full, all else being equal. Likewise, in embodiments in which the candidate nodes are distributed, e.g., geographically and/or in terms of network or other topography, a candidate node that is more "near" in some relevant sense to a client or other host that is likely to access the object, determined in some embodiments, for example, based on stored statistics and/or other data tracking past use of the object, access statistics regarding related objects, a location of a client or other host being used to store the object, etc., is more likely to be selected than one that is relatively further away, all else being equal. In various embodiments, resources may be associated with any arbitrary set of identifying attributes and biased at least in part on that basis. For example, resources may specialize in large files, classified information, or objects with unusually high vowel counts in their name. Resource requirements that share these attributes are then directed, e.g., by employing biasing as described herein, to the associated resource(s).

Resource allocation can be made significantly more efficient by providing arbitrary categorical distributions that reflect varying costs of object placement. Biases may also vary per object as well as globally. Any arbitrary external method can be used to generate the bias list on a per-object basis using statistical methods, policy inputs, or any other available data. These biases can be viewed as a vector of desired probabilities, object share, or relative affinity.

Storage locations in a distributed network are not the only critical resource. Network bandwidth can be contended as well. Existing hash function schemes such as the monotone ranged hash function unfairly distribute work load in the event of a node failure or bias change. Ranged hashing relies on picking the closest bucket to an object's location in an n dimensional vector space. When the number of buckets is significantly larger than the dimensionality of the vector space the result is extremely unbalanced network loading when relocating objects. This kind of unfair loading can place stress on a small number of nodes. The newly stressed nodes can cause failures to cascade, further exacerbating the problem.

A hash method can be constructed using multiplicative biases as coefficients to be multiplied by a family of independent hash functions. The preference list is then defined as the ordered list of the biased hashes. The method constructed here provides the desirable properties discussed above. Specifically, this method can bias decisions in any arbitrary way without causing unnecessary relocations and without unfairly spreading the necessary relocations among a small subset of available buckets. Not only multiplication, but any function taking a bias and a hash value as an input and providing a biased hash as an output can provide this property as long as the function is monotonically increasing with regard to either input parameter.

In various embodiments, a computer and/or or computer network has associated with it storage that resides on several different physical storage devices. When deciding where to place an object this could use total disk space or other metrics of storage and/or retrieval cost as an input to determine biases. The hash function would then take the object identifier of the object to be stored as its input. If some storage device has half the storage capacity it may receive about half of the write requests. Because of the repeatability of the hash implementation, any other computer in the network can determine where to retrieve the same file by computing the hash on the object identifier using the same set of biases.

Another possible implementation is for load balancing client sessions. A load balancing server may receive requests from users to connect to a server. In this instance the load balancing server could use server capacity as an input to determine biases for the hash function. The client identifier or network address can be used as the input to the hash function to determine a server to service the request. This scheme maximizes the probability that the load balancing server will select a server which already has an initialized session for the given user without requiring the load balancing server to keep a table mapping client identifiers to servers. This scheme also allows multiple load balancing servers to work in parallel without sharing state per connection. As long as the set of load balancing servers all share the same biases they will reach the same decisions about which servers should handle a given client's traffic.

Call centers could similarly use the algorithm to route incoming calls to a specific worker. Biases would then be based on the relative efficiency of the various workers. The input to the hash function could be the caller ID information of the incoming call. This would give each individual caller a high chance of reaching the same worker on subsequent calls while simultaneously providing appropriate workloads to each worker. Again, no record of association between past calls and the workers who serviced them would need to be kept or consulted.

In any of the above examples if there is no difference in probability desired between the various buckets then equivalent bias values can be used for all buckets.

Figure 2:
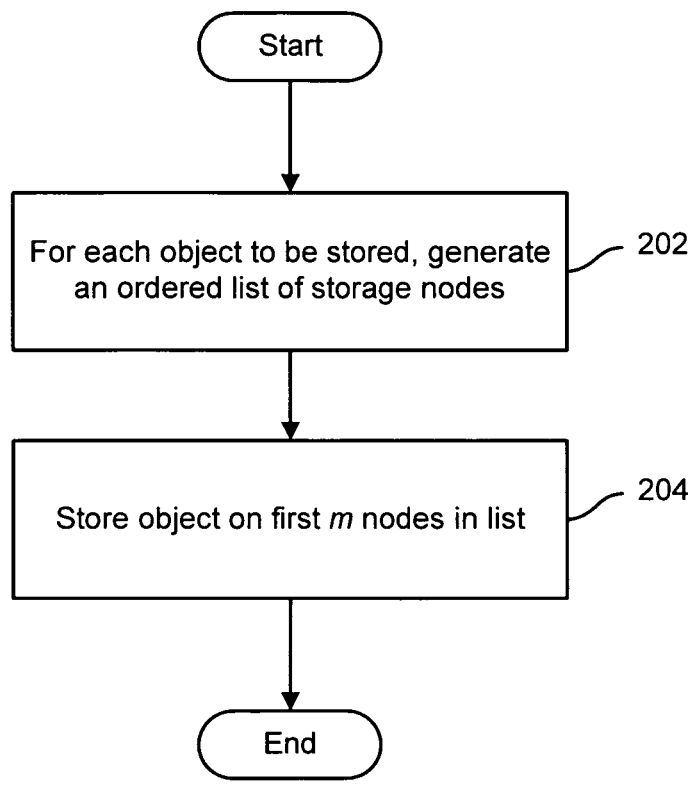
FIG. 2 is a flow diagram illustrating an embodiment of a process for storing data objects in a distributed storage environment.

FIG. 2 is a flow diagram illustrating an embodiment of a process for storing data objects in a distributed storage environment. Examples of a distributed storage environment include a network environment, such as the example shown in FIG. 1, in which a plurality of storage nodes (e.g., servers, etc.) are connected with one or more other nodes via network connections, and a single logical and/or physical node comprising a plurality of storage disks, drives, and/or other storage devices. In the example shown in FIG. 2, for each object to be stored, an ordered list of candidate storage nodes is generated (202). The object is stored in the first m nodes in the ordered list (204). For example, if candidate nodes A, B, C, and D were available, an ordered list in which the nodes were listed in an order of preference for having the object stored on that node would be generated, e.g., B-D-C-A. If the prescribed number of nodes m on which the object was to be stored was m=2, for example to achieve single redundancy, then in this example nodes B and D would be selected and the object would be stored on those two nodes.

In some embodiments, exceptions may be made to storing the object in the first m nodes in the sorted preference list. For example, exceptions may be made based on availability and capacity constraints as determined at run time. In some embodiments, if a node is determined to not be available, that node will not be selected even if it is within the first m nodes on the list. Instead, in some embodiments, the system will choose the first m available resources on the list.

In various embodiments, techniques described herein to select one or more storage nodes on which to store a data object are used to find the data object quickly after they have been stored. By knowing the preference list of where the object would be stored the probability is very high in various embodiments that the first location checked will be the correct location.

Figure 3:
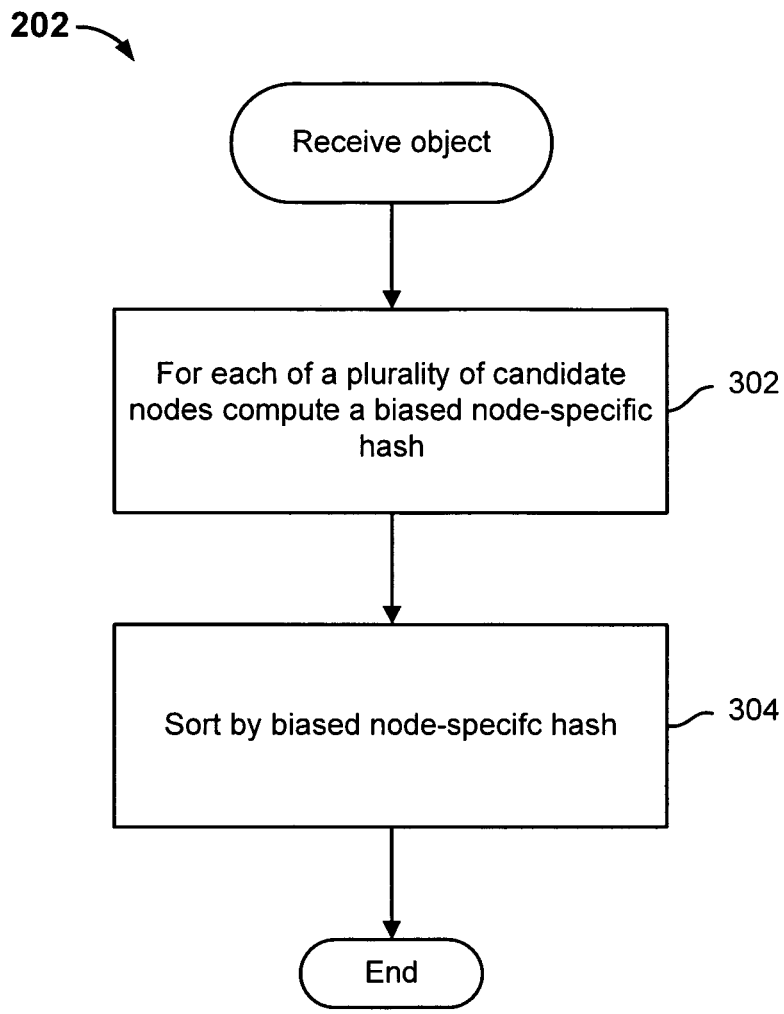
FIG. 3 is a flow diagram illustrating an embodiment of a process for generating an ordered list of candidate storage nodes.

FIG. 3 is a flow diagram illustrating an embodiment of a process for generating an ordered list of candidate storage nodes. In various embodiments, step 202 of FIG. 2 includes the process of FIG. 3. In the example shown, for each object received a biased node-specific hash is computed with respect to that object for each of a plurality of candidate nodes (302). For example, for a received object 1, a biased node-specific hash would be computed for each of nodes A, B, C, and D in the example above. In some embodiments, a set of unbiased node-specific hashes are computed for the object, e.g., $A_1$, $B_1$, $C_1$, and $D_1$, and a node-specific bias is applied to each to generate a set of biased node-specific hashes, e.g., $A_1'$, $B_1'$, $C_1'$, and $D_1'$. Referring further to FIG. 3, once a biased node-specific hash has been computed for the received object for each of the candidate nodes (302), an ordered list of candidate nodes is generated by sorting the candidate nodes by their respective biased hash values for the object (304).

In some embodiments, a biased hash list of resources is generated by hashing data associated with a resource requirement to a point in space. The resources themselves are represented by points in space and the biased hash list is formed by taking the distances from the resource requirement's point to all of the resource points and ordering these distances from shortest to longest. Adjusting biases of the various resources is done in various embodiments by moving the points in space, either through iterative methods, control systems, or statistical methods such as Correspondence Analysis, Principal Component Analysis, and other techniques.

Figure 4:
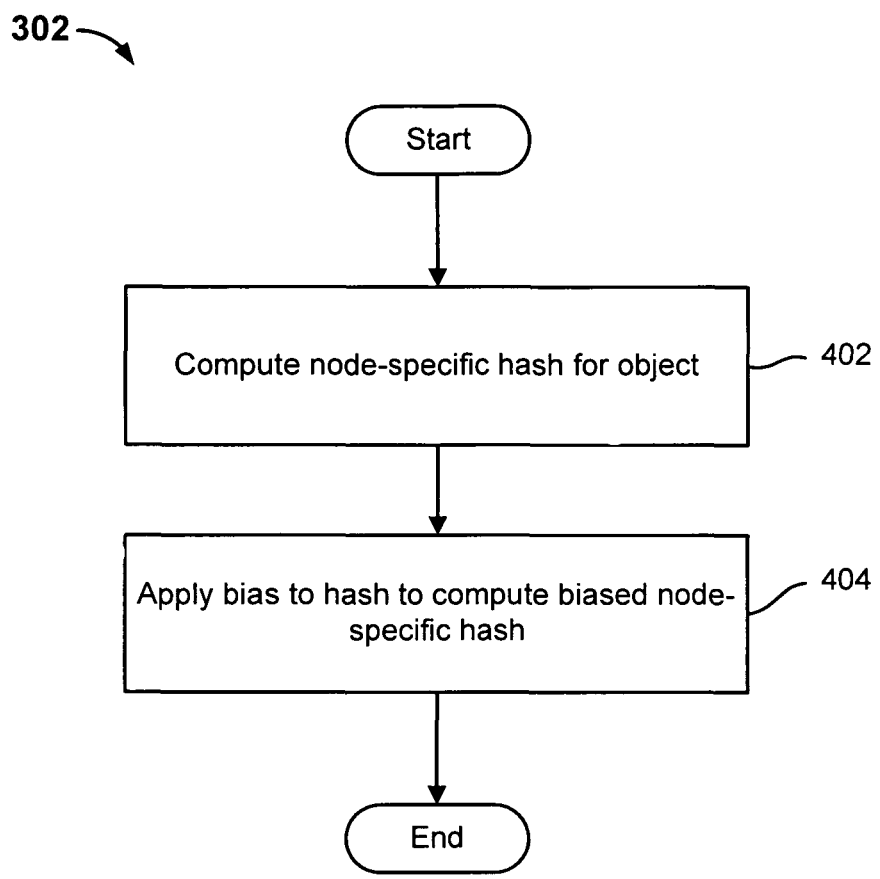
FIG. 4 is a flow diagram illustrating an embodiment of a process for generating a node-specific hash for a candidate node with respect to an object.

FIG. 4 is a flow diagram illustrating an embodiment of a process for generating a node-specific hash for a candidate node with respect to an object. In various embodiments, step 302 of FIG. 3 includes the process of FIG. 4. In the example shown, a node-specific hash is computed for the object to be stored (402). A node-specific bias is applied to the computed node-specific hash (404) to generate the biased node-specific hash for the object. In various embodiments, the node-specific hash values are biased by one or more techniques, for example by multiplying a hash value computed based on data associated uniquely (or likely so) with the object and data associated uniquely with the node, on the one hand, by a multiplicative bias. An example involving the use of multiplicative biases is described below. In other embodiments, the bias may in addition or instead involve addition or one or more other operations. In various embodiments, the biasing may be based on configured and/or configurable factors, such as differing capacity or remaining capacity, processing power and/or speed, communication speed, geography, network topology, etc. For example, a hash value for a storage node known or determined to be near a location from which a data object has most often and/or most recently been accessed may be biased in a way that makes it more likely that node will be in the first m nodes on the ordered list.

In some embodiments, statistics reflecting the location(s) from which a stored object has been accessed are kept. In some embodiments, object access statistics are evaluated and if an object is accessed solely or primarily and/or most recently from a location or set of locations associated with a particular storage node or subset of nodes, then for that object the node-specific hash value for that node or each of those nodes may be biased in an amount that creates a bias in favor of the object being stored, e.g., in a subsequent "save" operation, at that node (or those nodes). In some embodiment's, access information (e.g., statistics) may be observed and an object's association with a particular storage node may be reflected in an object's name and/or an addition or other annotation thereto, and/or in (other) associated metadata. In some embodiments, this portion of the name is used at storage time to compute a bias for the node(s) indicated by such annotation as being associated particularly with the object. In various embodiments, other factors may also be reflected in biasing, including configuration information, storage node statistics (e.g., space remaining, etc.), etc.

As noted above, techniques described herein facilitate the efficient use of newly added nodes and/or avoid inefficiency (e.g., excessive churn) when nodes are removed (e.g., due to failure, for maintenance, etc.).

Figure 5:
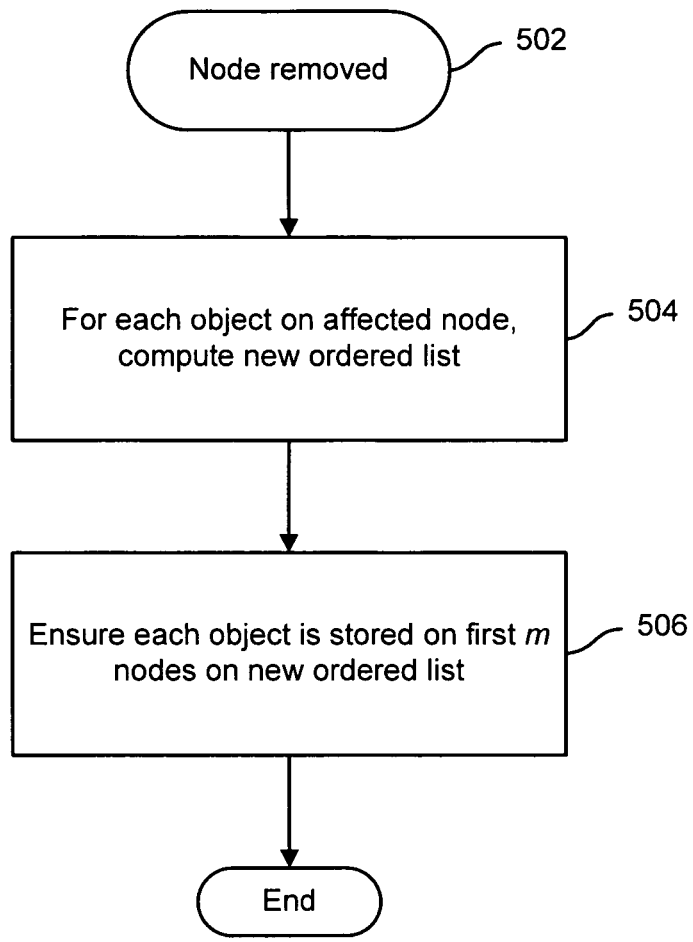
FIG. 5 is a flow diagram illustrating an embodiment of a process for relocating objects when a storage node is removed.

FIG. 5 is a flow diagram illustrating an embodiment of a process for relocating objects when a storage node is removed. In the example shown, when a node is removed (502), for each object that was stored on the affected node a new ordered list of candidate storage nodes is computed (504). In some embodiments, the process of FIGS. 2-4 is used to compute new ordered lists. Objects formerly stored on the removed node are copied, for example from other nodes on which they were stored redundantly prior to removal of the removed node, as needed to ensure that each is stored on the first m nodes in the object's new ordered list of nodes (506). Because the hash values and biases are independent between storage nodes, in some embodiments the new ordered list may be formed by simply removing the appropriate storage node(s) from the prior ordered list.

Figure 6:
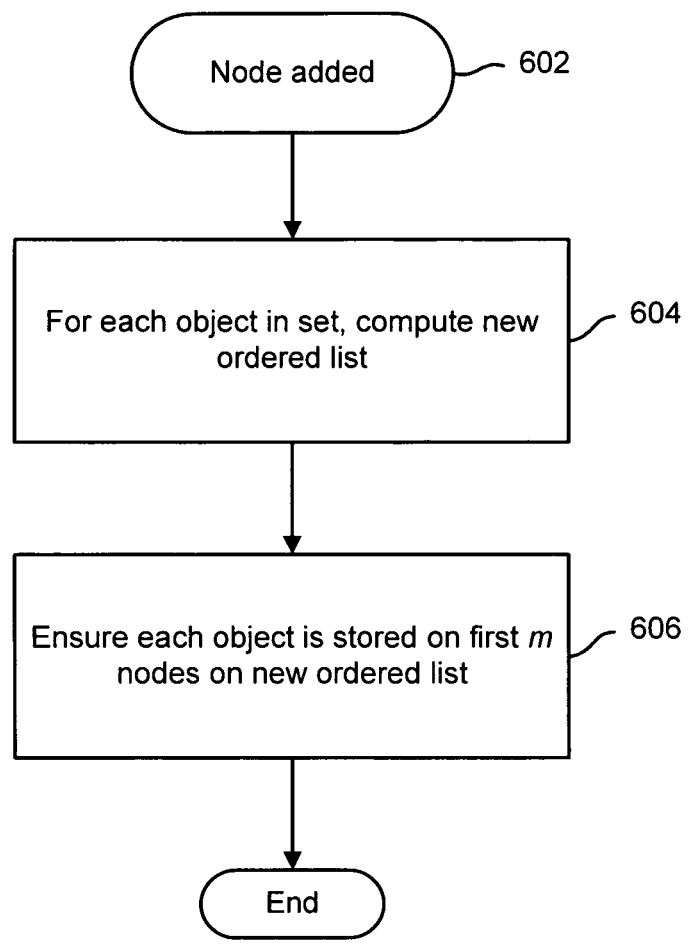
FIG. 6 is a flow diagram illustrating an embodiment of a process for populating an added storage node.

FIG. 6 is a flow diagram illustrating an embodiment of a process for populating an added storage node. In the example shown, when a node is added (602), for each object eligible to be stored on the added node a new ordered list of candidate storage nodes is computed (604). In some embodiments, the process of FIGS. 2-4 is used to compute new ordered lists. Objects for which the added node is included in the first m nodes on the object's new ordered list are copied to the added node, for example from other nodes on which they were stored prior to addition of the added node (606). Because the hash values and biases are independent between storage nodes, in some embodiments the new ordered list may be formed by only calculating the values for the newly added node(s) and inserting them in the appropriate location.

Figure 7:
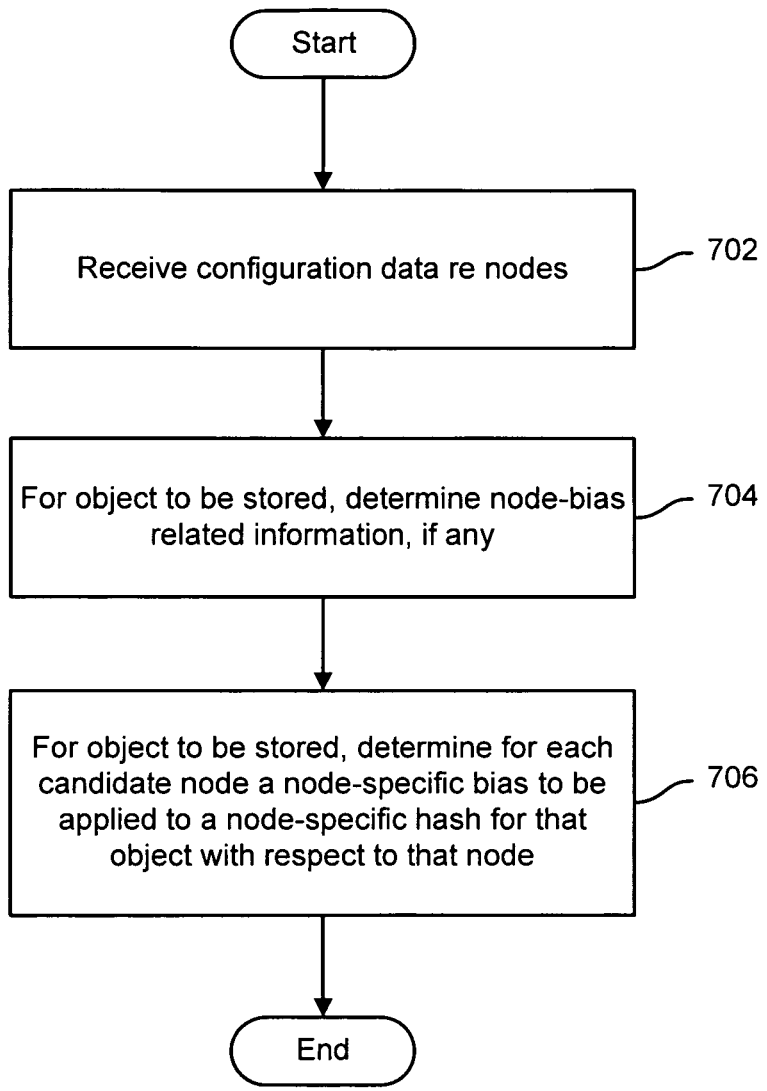
FIG. 7 is a flow diagram illustrating an embodiment of a process for determining biases for candidate nodes.

FIG. 7 is a flow diagram illustrating an embodiment of a process for determining biases for candidate nodes. In the example shown, configuration data regarding candidate nodes is received (702). Examples of configuration data include a storage capacity of each node; a location preference value for one or more nodes; an identification of a type, size, source, etc. of data object preferred to be stored on one or more nodes; and an identification of statistics to be gathered and/or used to determine biases. When an object is to be stored, node-bias related information for the object is determined (704). For example, access statistics for the object are evaluated in some embodiments. The node configuration information (702) and object information (704) are used to compute for each candidate node a node-specific bias to be applied to a node-specific hash for that object with respect to that node (706).

Figure 8:
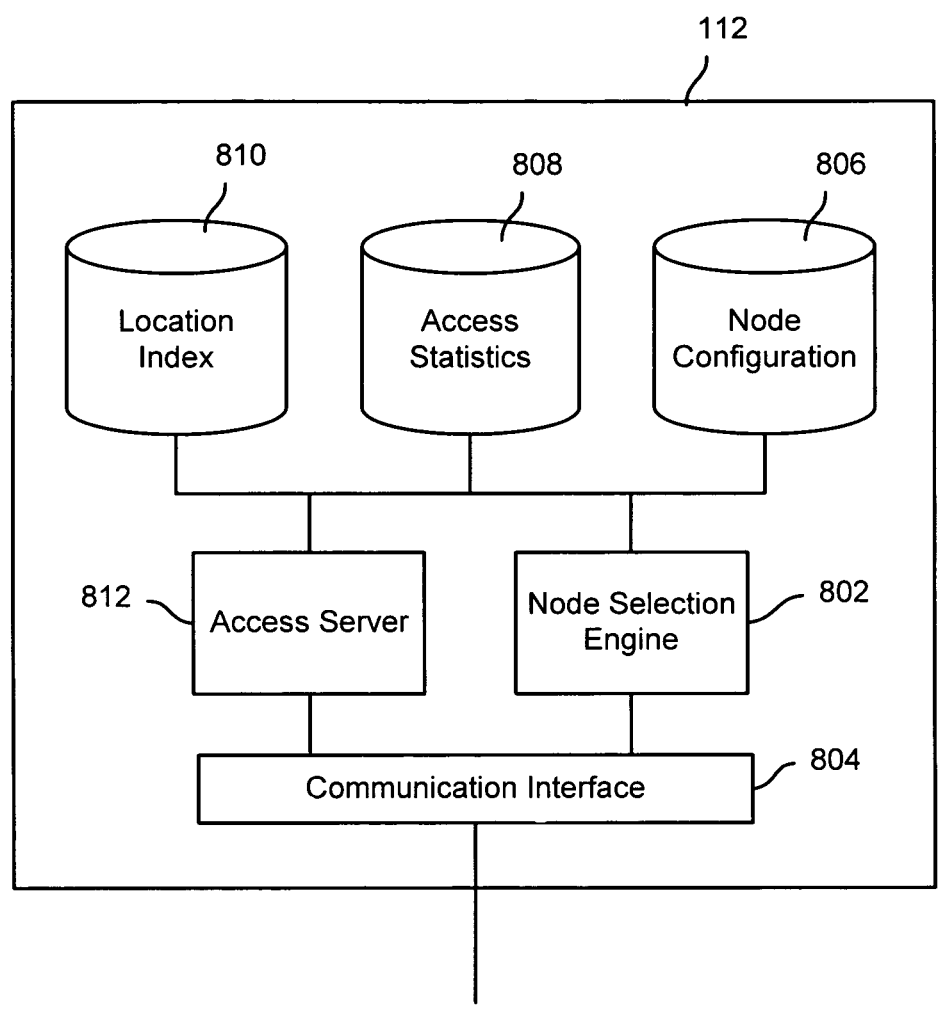
FIG. 8 is a block diagram illustrating an embodiment of a node selection system.

FIG. 8 is a block diagram illustrating an embodiment of a node selection system. In the example shown, node selector 112 of FIG. 1 includes a node selection engine 802 connected via a communication interface 804, such as a network interface card or other interface, to a network (not shown in FIG. 8), such as Internet 104 of FIG. 1. The node selection engine 802 in some embodiments is implemented by one or more processors configured to execute software or other computer instructions. The node selection engine 802 is configured to receive via communication interface 804 a request to store a data object. The node selection engine 802 consults a node configuration datastore 806 and object access statistics 808 to determine for each candidate node, with respect to the object, a biased node-specific hash value (e.g., using the process of FIG. 7). The node selection engine 802 sorts the nodes into an order based on the biased hash values (e.g., highest to lowest) and causes the object to be stored on the first m nodes on the list. The location(s) in which the object is stored is stored in a location index 810. In various embodiments, the node configuration data 806, access statistics 808, and location index 810 are stored in one or more of a memory, a disk or other drive, and/or another storage device comprising node selector 112. An access server 812 is configured to receive via communication interface 804 requests to access previously stored objects, and to use location index 810 to provide in response an indication of one or more nodes on which a requested object is stored. In some embodiments, the location index 810 may be omitted because the information is already available through calculation of the biased hash function. In some embodiments, temporary resource availability or capacity limitations may cause objects to skip earlier nodes in the hash list and instead reside on later storage nodes. In some embodiments, location index 810 is used order to quickly find all redundant copies as soon as any one copy is found.

In the equations discussed below, which are used in various embodiments, the following terms and definitions (1) through (12) are used:

(1) The set of buckets is denoted by K. Individual buckets are denoted with a subscript for bucket number such as $K_1$.

(2) |K| is the total number of buckets.

(3) The set of multiplicative biases is denoted as B. Individual biases from the set are denoted with a subscript bucket number such as $B_1$.

(4) |B| is the maximum value in the B.

(5) The set of hash functions H are all independent and uniformly distributed over the range of 0 to |H|. Thus, $H_1(x)$ is the hash of item x using the first function in the set. Constructing a large set of distinct functions may be difficult. For a sufficiently wide hash function such as SHA2 the hashes can be generated from different bit ranges of the output. Other approaches are to pass different initial values to the same hash function, or to prepend or append data to generate the alternate functions.

(6) W(B; n) is the probability of $K_n$ having the highest preference given bias set B and randomly selected hash values.

(7) $P_n(B; t)$ is the probability that $B_n H_n(x) = t$ given bias set B and a randomly selected item identifier x.

(8) $D_n(B; t) = \int_0^t P_n(B; t)dt$ is the cumulative distribution function associated with $P_n(B; t)$.

(9) G is the set of unique biases in ascending order. Thus $G_1$ is the minimum element of set B. |G| is the number of elements in set G. Thus $G_{|G|}$ is the maximum element of set B. For convenience, take $G_0 = 0$.

(10) $C_n$ is the count of elements of set B that are equal to $G_n$.

$$R(n) = \prod_{k=n}^{|G|} G_n^{C_n} \quad (11)$$

$$Q(x) = \prod_{k=1}^{|K|} D_k(x) \quad (12)$$

Equation (11) can be viewed as the product of all biases. Equation (12) can be viewed as the cumulative distribution function of all buckets.

Determining Selection Probabilities from Bias Sets. In various embodiments, the preference list of buckets is ordered such that the higher preference goes to the bucket $K_n$ where $B_n H_n(x) \geq B_m H_m(x)$ for all m. For the rare case that two or more preferences are exactly equal several different tie breaker schemes can be used. One method would be to take the population that tied for first place and repeat the same hash algorithm with a different set of hash functions from the same family and possibly adjusted biases. Other methods could be to make a selection from the subset using a more traditional hash function or to always allow the lowest numbered bucket to be selected. In other words, the preferred bucket is the one with the largest resulting product when its bias is multiplied by its hash value for a given object.

For discrete hash functions the probability of a node being tied for selection or being selected is found by:

$$W(B; n) = \sum_{t=0}^{|H|B_n} Q(t) \frac{P_n(t)}{D_n(t)}$$

For continuous hash functions the probability of a node being tied for selection or being selected is found by:

$$W(B; n) = \int_{t=0}^{|H|B_n} Q(t) \frac{P_n(t)}{D_n(t)} dt = \sum_{t=1}^{m} \frac{G_t^{C_t} - G_{t-1}^{C_t}}{C_t R(t)}$$

where m is selected such that $G_m = B_n$.

If the desired selection probabilities are known the biases can be determined by using the above equations via the Newton-Raphson method or any other iterative approximation method. Unfortunately these iterative processes can be slow for modern implementations when biases or hash bucket populations change frequently.

A faster convergence to the desired probability set can be obtained by observing that simultaneously changing several $B_n$ where $B_n = G_{|G|}$ will not change the relative proportions of buckets with lesser biases as long as the changed value still satisfies $B_n = G_{|G|}$. Thus it is possible to begin with an arbitrary selection for $G_1$, solve for the appropriate $G_2$ to obtain the desired ratio of selection rates, and then repeat in ascending order of bias until all buckets have been assigned an appropriate bias.

Exact values for probabilities are not ideal for a cost-based bias system that is used for choosing an assignment of data objects to nodes for storage. The desired probabilities should be scaled depending on the relative number of nodes and the percentage desired by each node. While affinities may not sum to 1 their ratios represent relative desired probabilities. Nodes that have a very small affinity for some object (and thus a high cost for serving it) should get even less, since they are not likely to be asked to service requests for that object. Nodes that have a moderately strong affinity for an object should receive slightly more than desired. These are the most likely places for object requests to be serviced. Finally, nodes that have an extremely strong affinity for an object (such as a 90% requested selection rate) should be given much but not all of the data they request in order to preserve properties of robustness in the event of failure and to more evenly distribute load on the network.

A method of approximating a set of biases from a set of desired selection probabilities while including the desired deviation is needed. Assuming $X_n$ is the requested affinity from an inverse cost metric and $\overline{X}$ is the mean of set X, one such method of calculation with desirable properties is $$B_n = X_n^{\frac{1}{|K|-1}} + \frac{X_n \overline{X}^{\frac{1}{|K|}}}{Y + Z|K|}$$

The values Y and Z are both constants. This function was chosen because the first term closely approximates the inverse function of the dominant term of the polynomial W(B; n) in the continuous case. This approximation serves to mostly linearize the relation between inset $X_n$ and $W_n$. The relationship is not quite linear because the root taken is slightly larger than the ideal linearizing root over the full range of the polynomial. This approximation also remains close for the discrete case. The second term provides the correction necessary to adjust the slope such that the properties discussed above are provided. Larger values of Y tend to give more weight to the first term in all cases while larger values of Z tend to give more weight to the first term as the bucket population increases.

While in a number of examples described in detail herein the resource requirement is storage of a data object and the resources ("buckets") are candidate storage nodes, the techniques described herein may be used in other contexts as well, including without limitation call center call routing and network resource or other load balancing, as noted above. Likewise, while biasing calculations used in some embodiments have been described in detail, in other embodiments other methods of determining biases and applying same to node- (or other bucket-) specific hash values (or other values computed to achieve a desired distribution) may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of selecting a resource to fulfill a resource requirement, comprising:
    computing for each of a plurality of resources, with respect to the resource requirement, a resource-specific affinity value;
    applying a bias to each of at least a subset of the resource-specific affinity values, wherein the bias comprises a function that is monotonically increasing both in terms of an input hash and a desired bias;
    sorting the biased, as applicable, resource-specific affinity values into a resource preference list; and
    using the sorted preference list to select a resource to fulfill the resource requirement.

2. The method of claim 1, wherein the resource-specific affinity value comprises a resource-specific hash value.

3. The method of claim 1, wherein the resource-specific affinity value is computed by computing a resource requirement-specific hash value, the hash value corresponding to a resource requirement-associated point in a space; and calculating a distance in the space between the resource requirement-associated point and a second point associated with the resource with respect to which the resource-specific affinity value is being computed.

4. The method of claim 1, wherein the bias comprises a resource-specific bias.

5. The method of claim 1, wherein a first resource-specific bias is applied to a first resource-specific affinity value associated with a first resource and a second resource-specific bias is applied to a second resource-specific affinity value associated with a second resource.

6. The method of claim 1, wherein the bias comprises a resource-specific bias determined for a particular resource based at least in part on a data associated with that particular resource.

7. The method of claim 1, wherein the bias is determined based at least in part on a data associated with the resource requirement.

8. The method of claim 1, wherein the bias is determined for a particular resource based at least in part on a data reflecting a relationship between the resource requirement and the particular resource.

9. The method of claim 8, wherein the bias is determined based at least in part on a stored data reflecting a past relationship between the resource and the resource requirement.

10. The method of claim 8, wherein the bias is determined based at least in part on a stored data reflecting a past relationship between a resource and one or more descriptive attributes of the resource requirement.

11. The method of claim 8, wherein the bias is determined based at least in part on a stored data reflecting a user configured relationship between a resource and one or more descriptive attributes of the resource requirement.

12. The method of claim 8, wherein the bias is determined based at least in part on a stored data reflecting a past relationship between the resource and a user with which the resource requirement is associated.

13. The method of claim 1, wherein the bias comprises a multiplicative bias.

14. The method of claim 1, wherein the resource requirement comprises a request to store a data object.

15. The method of claim 1, wherein the resource requirement comprises a request to find a previously stored data object.

16. The method of claim 1, wherein the plurality of resources comprises a plurality of storage nodes.

17. The method of claim 1, wherein a consistent hash function is used to compute the resource-specific affinity values.

18. The method of claim 1, wherein a monotone hash function is used to compute the resource-specific affinity values.

19. The method of claim 1, further comprising:
detecting that a removed resource has been removed from the plurality of resources; and
determining for the resource requirement a new sorted resource preference list that does not include the removed resource.

20. The method of claim 19, further comprising determining that the resource requirement was fulfilled previously, at least in part, using the removed resource.

21. The method of claim 1, further comprising:
detecting that an added resource has been added to the plurality of resources; and
determining for the resource requirement a new sorted resource preference list that includes the added resource.

22. The method of claim 21, further comprising using the new sorted resource preference list to determine that the added resource is to be used to fulfill the resource requirement.

23. The method of claim 1, wherein using the sorted preference list to select a resource to fulfill the resource requirement comprises using a first m resources in the sorted preference list to fulfill the resource requirement.

24. The method of claim 1, wherein using the sorted preference list to select a resource to fulfill the resource requirement comprises using a first m available resources in the sorted preference list to fulfill the resource requirement.

25. A resource selection system, comprising:
a communication interface configured to receive a communication comprising a resource requirement; and
a processor coupled to the communication interface and configured to:
compute for each of a plurality of resources, with respect to the resource requirement, a resource-specific affinity value;
apply a bias to each of at least a subset of the resource-specific affinity values, wherein the bias comprises a function that is monotonically increasing both in terms of an input hash and a desired bias;
sort the biased, as applicable, resource-specific affinity values into a resource preference list; and
use the sorted preference list to select a resource to fulfill the resource requirement.

26. The system of claim 25, wherein a first resource-specific bias is applied to a first resource-specific affinity value associated with a first resource and a second resource-specific bias is applied to a second resource-specific affinity value associated with a second resource.

27. The system of claim 25, wherein the bias is determined for a particular resource based at least in part on a data reflecting a relationship between the resource requirement and the particular resource.

28. The system of claim 25, wherein the resource requirement comprises a request to store a data object and the plurality of resources comprises a plurality of storage nodes.

29. The system of claim 25, wherein the processor is further configured to:
detect that a removed resource has been removed from the plurality of resources; and
determine for the resource requirement a new sorted resource preference list that does not include the removed resource.

30. The system of claim 25, wherein the processor is further configured to:
detect that an added resource has been added to the plurality of resources; and
determine for the resource requirement a new sorted resource preference list that includes the added resource.

31. A computer program product for selecting a resource to fulfill a resource requirement, the computer program product being embodied in a non-transitory computer readable storage medium and comprising computer instructions for:
computing for each of a plurality of resources, with respect to the resource requirement, a resource-specific affinity value;
applying a bias to each of at least a subset of the resource-specific affinity values, wherein the bias comprises a function that is monotonically increasing both in terms of an input hash and a desired bias;
sorting the biased, as applicable, resource-specific affinity values into a resource preference list; and
using the sorted preference list to select a resource to fulfill the resource requirement.

* * * * *